United States Patent [19]
Ritter

[11] 4,302,228
[45] Nov. 24, 1981

[54] HEADER PIPE ATTACHMENT

[75] Inventor: Kent E. Ritter, Wellsville, N.Y.

[73] Assignee: The Air Preheater Company, Inc., Wellsville, N.Y.

[21] Appl. No.: 197,303

[22] Filed: Oct. 15, 1980

[51] Int. Cl.³ .............................................. B01D 46/04
[52] U.S. Cl. ........................................ 55/302; 403/28; 403/189
[58] Field of Search .................... 55/302; 403/28, 30, 403/189; 239/397.5; 248/DIG. 1, 571, 232–234; 165/81; 285/187, 189, 200

[56] References Cited

U.S. PATENT DOCUMENTS

| | | | |
|---|---|---|---|
| 3,228,612 | 1/1966 | Graham et al. | 239/397.5 |
| 3,256,679 | 6/1966 | Snyder | 55/302 |
| 3,376,696 | 4/1968 | Wells et al. | 55/302 |
| 3,680,285 | 8/1972 | Wellan et al. | 55/302 |
| 3,733,784 | 5/1973 | Anderson et al. | 55/302 |
| 3,926,595 | 12/1975 | Bockman | 55/302 |
| 4,157,901 | 6/1979 | Schallenbend | 55/302 |
| 4,208,270 | 6/1980 | Grieve et al. | 285/187 |

*Primary Examiner*—Bernard Nozick
*Attorney, Agent, or Firm*—Wayne H. Lang

[57] ABSTRACT

A bag filter apparatus that exhausts a blast of compressed air into the open ends of a series of filter bags to remove dust particles that have collected on the outer surface thereof. The compressed air is exhausted from nozzle means in a header pipe that is precluded from excessive distortion, while it may be quickly disassembled and accurately re-assembled to achieve optimum performance.

4 Claims, 3 Drawing Figures

HEADER PIPE ATTACHMENT

BACKGROUND OF THE INVENTION

The invention relates to bag filter apparatus that is adapted to receive gas carrying a quantity of dust or other particulate matter and permit clean gas to flow therethrough while retaining the particulate matter on the surface of the filter. To remove dust deposits therefrom, a series of laterally aligned nozzles are adapted to exhaust a blast of compressed air into the open end of each filter bag. Such a reverse blast of air causes a momentary reversal of gas flow through each filter bag and flexing of the filter that loosens particulate matter collected on the outer surface thereof so the dust will fall off and each bag may be returned to a clean condition whereby collecting effectiveness may be restored.

A header carrying a series of spaced nozzles is concentrically positioned above the open end of each filter bag in order that compressed air exhausting from a nozzle diverges and closes off the normal flow of carrier gas through each filter bag. If the header should become slightly twisted or distorted whereby the nozzle will exhaust a blast of compressed air obliquely toward the end of the adjacent filter bag, normal fluid flow in the opposite direction will not be stopped, so reverse flexing of the filter bags will not take place, and the cleaning arrangement will not be effective. Thus, the arrangement defined herein will preclude thermal distortion of the header during normal operation. Furthermore, the arrangement defined will permit the bag filter assembly to be quickly and precisely re-assembled after disassembly to maintain a high operating effectiveness.

Prior art cleaning arrangements have variously described nozzles for discharging compressed air into the open ends of aligned porous filter bags, but none is known to precisely locate each nozzle with respect to each bag. U.S. Pat. Nos. 3,733,784 and 4,157,901 simply show a header pipe with nozzles that exhaust compressed air into the open end of a series of adjacent filter bags. Thermal distortion of an unsupported header pipe would direct the cleaning air obliquely away from the open end of an adjacent filter bag so cleaning would be less than optimum.

U.S. Pat. Nos. 3,926,595 and 3,680,285 show header pipes with nozzles that direct a reverse flow of cleaning gas into the open ends of adjacent bag filters. The header pipes are supported at opposite ends by the walls of a housing, but there is no provision for dismantling the header pipes or containing the inevitable thermal distortion that will take place when a temperature change occurs.

SUMMARY OF THE INVENTION

This invention therefore has as its principal objective the provision of a support for a header pipe that exhausts a blast of compressed cleaning air into the open ends of a series of open-ended bag filters. The invention discloses a particular arrangement whereby a header pipe is maintained in a particular position to insure that a blast of compressed air exhausting therefrom is directed precisely into each open-ended filter bag to provide complete stoppage of gas flow therethrough and optimum removal of particulate matter therefrom. Moreover, the arrangement is adapted to permit rapid take-down and assembly while maintaining a strict control on the accuracy of such operations.

DESCRIPTION OF THE PREFERRED EMBODIMENT

Figure 1:
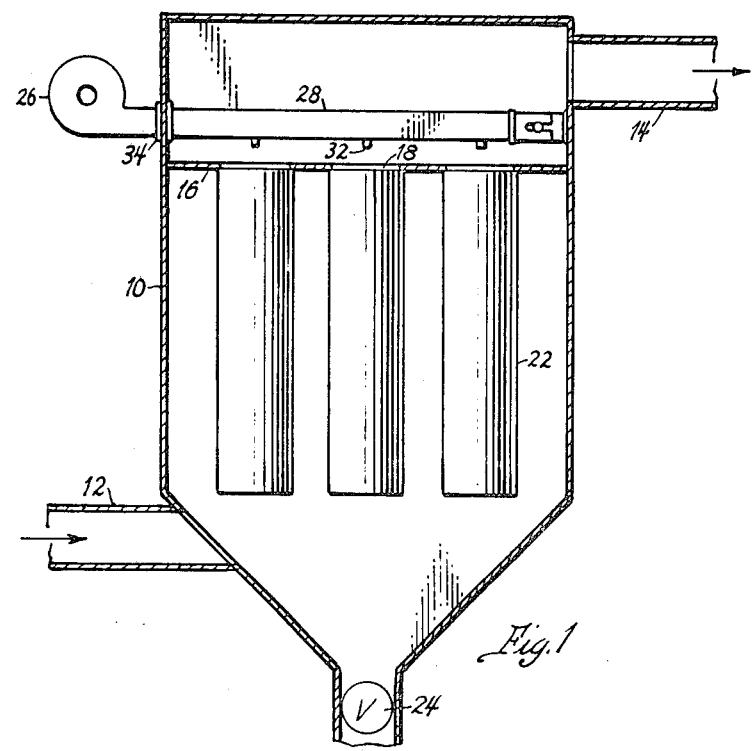
FIG. 1 is a side elevation of a bag filter showing an arrangement according to the present invention.
Figure 2:
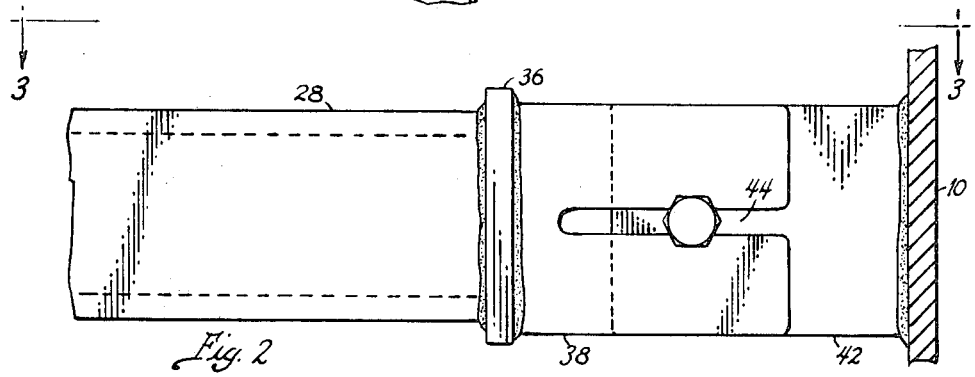
FIG. 2 is an enlarged side elevation of the attachment for a header.
Figure 3:
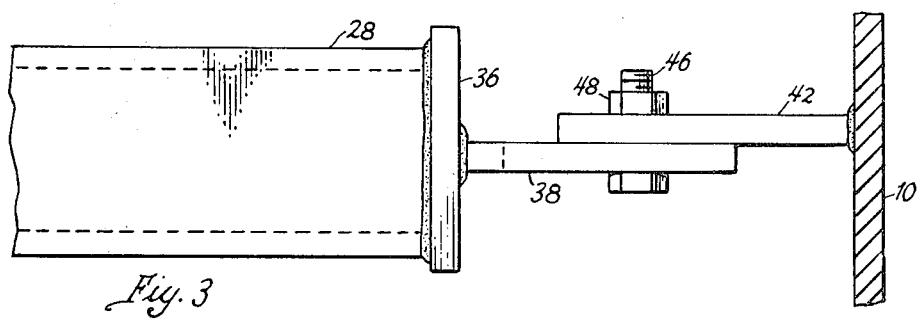
FIG. 3 is an enlarged top view of the header pipe attachment.

Bag filter apparatus generally comprises a housing 10 having an inlet 12 for dust bearing gas and an outlet 14 for the exhaust of clean gas therefrom. The housing is separated into inlet and outlet compartments by a tube sheet 16 having a series of apertures 18 therein. An open-ended bag filter 22 is adapted to abut the periphery of each aperture in the tube sheet and have a closed end that hangs into the inlet compartment of the housing whereby dust bearing carrier gas is forced to flow through the filter when passing from the inlet compartment to the outlet.

When dust bearing gas is directed through the filter bags, dust collects on the outer surface of each filter bag and only clean gas is permitted to flow therethrough. After excessive amounts of dust have accumulated on the outer surface of the filter bags, however, resistance to fluid flow therethrough gradually increases and the effectiveness of the filter is significantly reduced. Consequently, the collection of dust known as the "dust cake" must be periodically removed therefrom to retain the filter unit near its original filtering capacity.

An arrangement widely accepted for removing the "dust cake" from the filter bags includes means that projects a reverse blast of air into the open ends of the several filter bags. The reverse blast of air entering the open ends of the filter bags causes a momentary excess of pressure within the bags that in turn causes them to flex outward and break the "dust cake" therefrom. The "dust cake" then falls to the bottom of the housing where it is removed through a suitable clean-out door 24.

A charge of compressed air for cleaning the bags is developed in a compressor 26 and delivered to a header 28 having openings or nozzles 32 that are aligned with respective filter bags. The header is usually supported at one or both ends on opposite housing walls. If supported at one end only, the non-supported end is free to droop, twist or otherwise thermally distort so the exhaust openings 32 do not properly align with the open ends of the bags. If supported at both ends, thermal expansion causes the header to press against the housing walls to distort the header and the housing. Moreover, disassembly of the unit is difficult and slow, and an accurate re-assembly is nearly impossible.

In accordance with this invention there is provided an arrangement whereby a header pipe for the cleaning nozzles of a bag filter is supported in a substantially fixed position relative to the open ends of a series of adjacent filter bags whereby the jets of cleaning air exhausting from the several nozzles thereof are always exhausted into the open ends of the filter bags. Moreover, the inlet end of the header pipe is rigidly connected to one wall of the filter housing, while the opposite end of said header is slidably connected to a spaced wall of said housing to permit relative expansion therebetween. Furthermore, the header pipe is adapted to be readily removed from the apparatus and quickly replaced without requiring a specific alignment of each nozzle with the open end of an adjacent filter bag.

The inlet end of the header 28 is coupled at 34 to the source of compressed air 26. The header 28 has nozzles or openings 32 that exhaust into a series of filter bags adjacent thereto, and is closed off by an end plate 36 lying parallel to and spaced from the adjacent housing wall. An extension plate 38 is welded to the end plate 36 to provide a co-linear extension to said header pipe that terminates in spaced relation to a vertical wall of said housing. A support plate 42 slidably adjacent to the extension plate 38 is welded to the housing wall whereby said support plate may be moved relative thereto, inasmuch as the support plate is relatively fixed while the guide plate may move in or out, up or down with thermal deformation of the header pipe 28. This invention provides an arrangement that precludes relative rotary movement or vertical movement of the header but permits expansion or contraction thereof in a longitudinal direction.

An effective arrangement for slidably coupling the support plate to the guide plate requires that a longitudinal slot 44 be formed in the outer end of the guide plate. A stud 46 secured to the support plate extends loosely through the slot 44 and has a head that slidably abuts the outer side of the guide plate 38 whereby the guide plate may be moved longitudinally with respect to the support plate, but relative vertical movement or relative rotational movement is completely precluded.

The arrangement illustrated is symbolic of the slidable linkage between the support plate and the guide plate deemed necessary to maintain the exhaust openings of the header pipe aligned with the open ends of the filter bags while still permitting limited thermal expansion of the header. However, a reversed organization of parts is possible if the support plate is slotted to slidably engage a stud carried by the guide plate. This or other variations may be effected without departing from the spirit of the invention whose scope is defined by the appended claims.

What is claimed is:

1. Bag filter apparatus having walls defining a filter compartment with an inlet for gas to be filtered and an outlet for the exhaust of clean gas therefrom, a tube sheet having a series of apertures therein lying between inlet and outlet driving the housing into inlet and outlet chambers, an open ended filter bag depending from each aperture of the tube sheet, cleaning means for said bag filters comprising a source of compressed air, a header pipe having an inboard end thereof carried by the housing adapted to receive compressed air from said source, an outboard end of the header extending into the outlet chamber of said housing parallel to the tube sheet and ending in spaced relation with a wall of said apparatus, said header pipe having openings therein that exhaust compressed air into the open ends of aligned filter bags, closure means at the outboard end of the header pipe adapted to preclude flow therethrough, support means carried by the housing adapted to limit expansion of said header to a longitudinal direction comprising a guide plate having a solid end fixed to the end of the header pipe and an end with an axially disposed slot extending outward therefrom into spaced relation with the housing wall, and means carried by the wall of the housing adapted to slidably abut the slot in the end of the guide plate to permit longitudinal movement therebetween.

2. Bag filter apparatus as defined in claim 1 wherein the means carried by the housing comprises a support plate laterally adjacent the guide plate, and stud means on the support plate slidably engaging the slot in the guide plate to preclude rotational movement therebetween.

3. Bag filter apparatus as defined in claim 2 wherein the header pipe is co-linear with the slotted guide plate and the support plate to permit friction-free expansion of the header pipe.

4. Bag filter apparatus as defined in claim 3 wherein the stud means carries a head portion adapted to embrace the side of the guide plate opposite the support plate when the stud slidably engages the slot.

* * * * *

UNITED STATES PATENT AND TRADEMARK OFFICE
CERTIFICATE OF CORRECTION

PATENT NO. : 4,302,228
DATED : November 24, 1981
INVENTOR(S) : Kent E. Ritter

It is certified that error appears in the above—identified patent and that said Letters Patent is hereby corrected as shown below:

Claim 1, Line 5  change "driving" to --dividing--

*Signed and Sealed this*

*Twenty-fifth* Day of *May 1982*

[SEAL]

Attest:

Attesting Officer

GERALD J. MOSSINGHOFF
*Commissioner of Patents and Trademarks*